United States Patent [19]

Blad et al.

[11] Patent Number: 4,716,272

[45] Date of Patent: Dec. 29, 1987

[54] METHOD OF ATTACHING A CONNECTION PIECE TO A METAL SURFACE BY BRAZING

[75] Inventors: Per A. Blad, Stockholm; Rolf Johansson, Åkersberga, both of Sweden

[73] Assignee: AGA Aktiebolag, Lidingo, Sweden

[21] Appl. No.: 756,631

[22] Filed: Jul. 19, 1985

[30] Foreign Application Priority Data

Aug. 10, 1984 [SE] Sweden ................. 8404050

[51] Int. Cl.[4] ............................................. B23K 1/10
[52] U.S. Cl. ............................. 219/129; 219/85 M; 219/99
[58] Field of Search .............. 219/129, 127, 99, 98, 219/85 M, 85 R, 85 F, 136, 137 R

[56] References Cited

U.S. PATENT DOCUMENTS

| 2,711,798 | 6/1955 | Aversten ................. 219/98 |
| 3,735,088 | 5/1973 | Hall ....................... 219/85 R |
| 4,195,279 | 3/1980 | Lemcoe et al. ......... 219/85 R |
| 4,333,598 | 6/1982 | Ittner et al. ............ 219/85 R |

FOREIGN PATENT DOCUMENTS

| 168107 | 4/1951 | Austria . |
| 1137287 | 9/1962 | Fed. Rep. of Germany . |
| 2750390 | 5/1978 | Fed. Rep. of Germany .... 219/85 R |
| 2830721 | 1/1980 | Fed. Rep. of Germany . |

OTHER PUBLICATIONS

Japanese 58 110 171, (Pat. Abstracts of Japan vol. 7, No. 215, (M 244) (1360), Sep. 22, 1983.

*Primary Examiner*—E. A. Goldberg
*Assistant Examiner*—C. M. Sigda
*Attorney, Agent, or Firm*—Pollock, Vande Sande & Priddy

[57] ABSTRACT

A method of attaching a connection piece of metal to a metal surface by brazing wherein the required heat is generated by an electric arc. The heat generated by the electric arc is conducted through at least a portion of the connection piece and melts a brazing metal provided between the connection piece and the metal surface. The heat conducting portion of the connection piece prevents direct contact between the electric arc, the metal surface and the brazing metal during melting which prevents disadvantageous thermal actuation of the metal surface. When the current to the electric arc has been disconnected, a mechanical force is applied to the heat conducting portion of the connection piece pressing the latter against the metal surface and pressing out a portion of the brazing metal from underneath the remaining joint-forming surfaces of the connection piece.

10 Claims, 24 Drawing Figures

METHOD OF ATTACHING A CONNECTION PIECE TO A METAL SURFACE BY BRAZING

The present invention relates to a method for attaching a connection piece of metal to a metal surface by brazing, in which the required heat is generated by an electric arc. The method is generally applicable in two fields, one of which comprises electric contact connection of rail and tube ends, and the other comprising other metal attachment objects such as clamps and bar-shaped means such as bolts.

A method already known in the art by which these connections have been provided is by pin-brazing described in Swedish Pat. No. 129 849. In this method an electrode is used, the point of which consists of a certain amount of metal brazing and to which is attached a capsule equally made of metal brazing and containing a fluxing agent. In the case of attaching an electric contact connection or a small metal object such as a clamp by brazing a connection piece provided with an opening is also used.

The brazing is performed such that after cleaning of the joint to be brazed the electrode is connected to the plus pole, and the work-piece, e.g. a rail, to the minus pole, the connection piece in the form of e.g. a cable lug is placed abutting the braze joint, and an electrode is inserted into the opening of the connection piece and pressed directly to the rail by a well-defined force provided by a mechanical spring. When the current is closed a short-circuit occurs between the electrode and the rail. The current actuates an electromagnet which is dimensioned to overcome the force of the mechanical spring and raises the electrode about 2 mm, whereby an electric arc is formed between the electrode and the work-piece, and the brazing metal and fluxing agent applied to the elctrode begin to melt down into the opening of the cable lug. By capillary action the brazing metal is sucked in between the cable lug and the rail whereby these members are interconnected. The brazing metal is transferred to the rail in a similar manner as added material in commonly known electric arc welding. A special device breaks the current circuit when the exact amount of current required to melt down all the brazing metal on the electrode has passed. When the current is broken, the force of the electromagnet also ceases. As a consequence, the spring mechanism pushes the remaining portion of the electrode back towards the work-piece and into the molten brazing metal so that the electrode is brazed to the work-piece. The entire brazing procedure takes 1 to 1.5 seconds. When the brazing is finished, the remaining portion of the electrode is mechanically removed. The melting temperature of the electrode brazing metal is essentially lower than that of steel, for example. Therefore the energy supply can be adjusted to melt the brazing metal but not the steel of a work-piece.

In case a metal bolt or pin is to be attached by brazing, the same method is used but without the connection piece. The electrode is attached by brazing it on the base. The bolt or pin constitutes the electrode.

It is a disadvantage of the method that when it is applied to a rail of a railway the heating effect is so great that a change of structure, the formation of martensite, may occur locally below the brazing joint of the rail. Another disadvantage of the method is the relatively heavy consumption of silver brazing metal of each brazing joint when electric contact connections are brazed. Due to the geometric shape of the joint the major portion of the brazing metal constitutes filling material. Only a minor portion serves as connection material between the cable lug and the rail. The method was developed at a time when the price of silver was essentially lower than at present, and the consumption of brazing metal was therefore of no great importance. The heavy increase in the price of silver in recent years now directly affects the cost competitiveness of the method.

A further disadvantage of the method is that the brazing metal will be in direct contact with the electric arc. Certain alloying materials having a low boiling point are evaporated during the brazing process, especially zinc. The evaporation is so heavy that the composition of the brazing metal is changed which causes a reduction in the strength of the joint.

A further disadvantage of the method is that brass from the rear portion of the electrode may be molten and alloy with the previously molten off silver brazing metal, which makes the connection brittle. The brazing time is defined by a melting copper wire connected to the electrode, the wire having a specific breaking time at a given current. The current is provided by a current source, usually comprising batteries. As the batteries are discharged and the potential decreases, the brazing current also decreases, and the breaking time of the melting wire increases. The prolongation of the brazing time caused hereby has thus a negative effect on the brazing result.

Another method of providing an electric contact connection is by means of a special type of thermit welding described in West German Pat. No. 2 830 721. This method utilizes a graphite pot containing a reaction chamber and a molding chamber, these chambers being interconnected by a molding passage. The molding chamber has an opening for insertion of the cable which is attached by welding. A metallic plate provided with a brazing metal layer on its bottom face is also used. The welding is carried out in such way that the metallic plate with the brazing metal is first placed on the welding spot. The graphite pot with the electric conductor is then placed on top. The molding passage between the reaction chamber and the molding chamber is then covered by a metal washer and a predetermined amount of alumino-thermic powder is charged into the reaction chamber. When the reaction has started the powder mixture reacts thermo-chemically in a known manner and the hot liquid metal is collected in the bottom portion of the reaction chamber, melts the metal washer and flows into the molding chamber. The top side of the metallic plate provided with brazing metal and disposed below the opening in the molding chamber is then molten and the electric conductor in the molding chamber is thereby attached by welding to this plate. The brazing metal under the plate is simultaneously heated and molten whereby the metallic plate is in turn attached by brazing to the base.

It is a disadvantage of this method that the inherent thermit powder mixture as well as the mold are hygroscopic which makes the method sensitive to damp weather. Due to the rapid heating of the powder during the reaction, the adsorbed water is transformed to water vapor. Molten metal may be thrown out of the reaction chamber in an explosive-like manner by the pressure created which is dangerous to the operator. A further disadvantage is that to obtain a successful welding result the temperature of the thermo-chemically produced molten metal must be between 2040° C. (the melting point of aluminium oxide) and 2500° C. (the evaporation point of aluminium). This may be performed when the volume of the weld is large such as in all-welding of a rail. For a smaller weld volume the surface volume ratio of the weld is greater which results in greater loss of heat per unit of volume of the weld. The temperature gradient of the molten metal is thus greater which leads to an increased chance that the temperature might be lower or higher than the required temperature limits.

The present invention relates to a method and device for performing the method, by which the mentioned disadvantages are eliminated but at the same time maintaining the advantages of the pin brazing process, namely rapid brazing and good electric conductivity of the connection. The invention is generally embodied in that the heat generated by the electric arc and utilized for the brazing is conducted through at least a portion of the connection piece and causes a brazing metal provided between the connection piece and the metal surface to melt, the portin of the connection piece preventing the electric arc from making direct contact with the metal surface and the brazing metal. Disadvantageous thermal actuation of the metal surface is prevented, a mechanical force is applied to the heat conducting portion of the connection piece after the current to the electric arc has been disconnected, whereby the connection piece is pressed against the metal surface, and a portion of the brazing metal underneath is pressed out under the remaining joint-forming surfaces of the connection piece also.

The invention will be described with reference to the accompanying drawings.

FIG. 6a–p illustrate various details of the design of a metal plate inherent in the contact connection.

Figure 1:
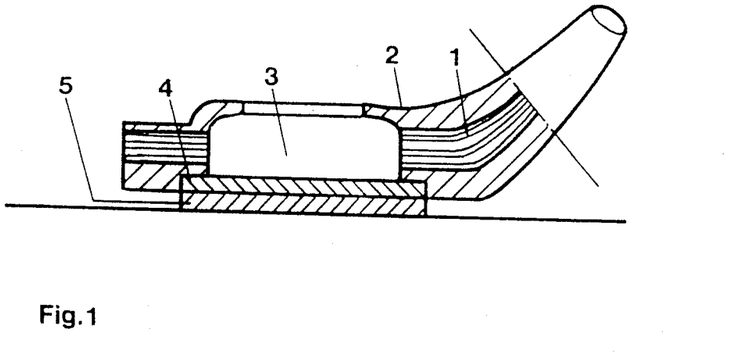
FIG. 1 is a cross-section of a nonbrazed electric contact connection.
Figure 2:
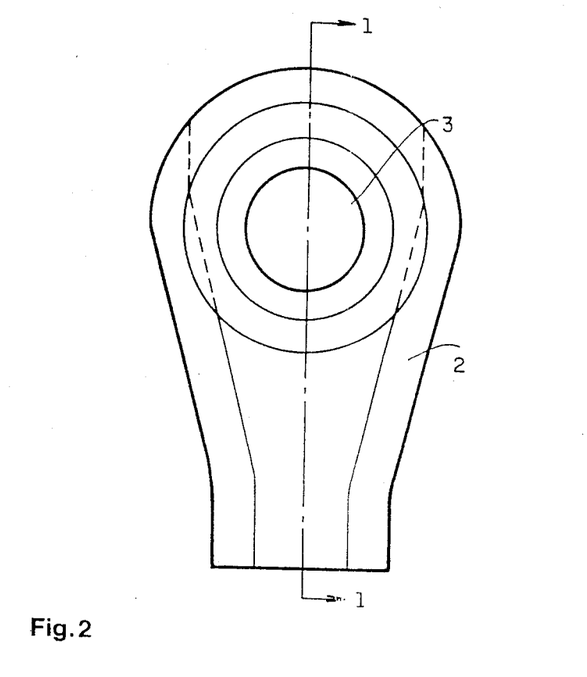
FIG. 2 is a top plan view of the same contact connection.

The contact connection shown in FIG. 1 comprises a cable 1 of for instance copper, a cable lug 2 with a flanged opening 3 which is for example copper, aluminium, or steel, a preferably circular plate 4 of a relatively high-melting metal, and a layer 5 of a low-melting brazing metal, for example a silver brazing metal. FIG. 2 illustrates the same connection in a top plan view.

Figure 3:
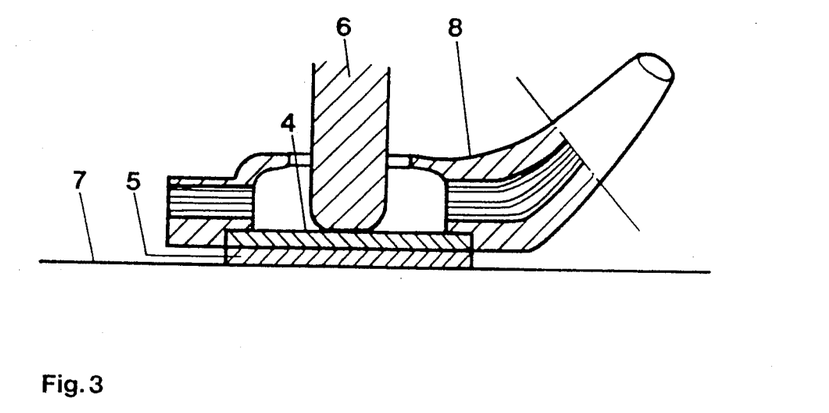
FIG. 3 illustrates a cross-section of an electric contact connection with an electrode in a position for initiating the brazing process.

The brazing process will be described below with reference to FIG. 3. The description relates to brazing of electric contact connections and small metal objects such as clamps. As in the previously known pin brazing, the brazing spot of the work-piece, for example a rail, is cleaned by grinding, the electrode 6 is connected to the plus pole and the work-piece 7 to the minus pole of the current source, the contact connection 8 is placed onto the brazing spot, and the electrode is inserted in the opening thereof. The electrode 6, however, is not in direct contact with the base as known in the prior art, but with the metal plate 4. When the current is closed and the electrode is raised an electric arc is formed between the same and the metal plate. The electric arc heats the plate whereby the silver brazing metal 5 applied on the opposite side melts due to heat conduction. When the current has been disconnected the electrode presses the metal plate against the base whereby some of the molten brazing metal underneath is pressed out under the cable lug. The thicker the metal plate, the lower the maximum temperature of the silver brazing metal will be. Above a certain thickness, the brazing metal will not melt. By selecting an appropriate plate thickness it is possible to obtain a maximum brazing metal temperature between the working temperature of the brazing metal and the austenitizing temperature of the rail of about 800° C. The plate is attached by brazing to the rail without any detrimental structural change thereof. Thus, the silver brazing metal 5 does not originate from the electrode but is previously applied below the plate of the cable lug so that it will not be in contact with the electric arc. The chemical composition of the brazing metal will therefore not be changed, and the strength remains intact.

Figure 4:
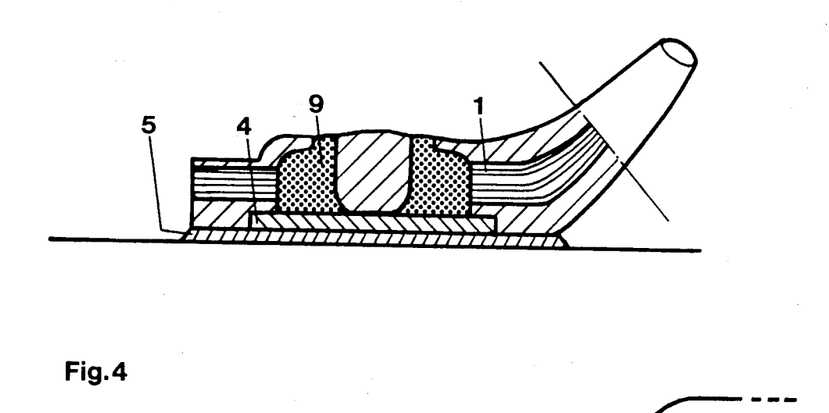
FIG. 4 is a cross-section of a contact connection attached by brazing.

FIG. 4 illustrates the metal plate 4 which separates the material 9 molten off from the electrode from the silver brazing metal 5 applied below the metal plate. Thus, no alloying of brass into the brazing metal with subsequent embrittling occurs. It is also apparent from the Figure that the cable 1 is in direct contact with the molten off material 9 which by capillarity is sucked in between the individual cable wires and is subsequently solidified. Thus, the advantageous electric properties characterizing previous types of connections still remain. Further, the required total amount of silver brazing metal is reduced, as the purpose of the molten off material 9 is now generally to constitute filling material in the opening of the cable lug above the metal plate. The electrode therefore need not contain as much brazing metal as previously or contain any brazing metal. The electrode may comprise for example brass with a capsule of silver brazing metal containing a fluxing agent.

Figure 5:
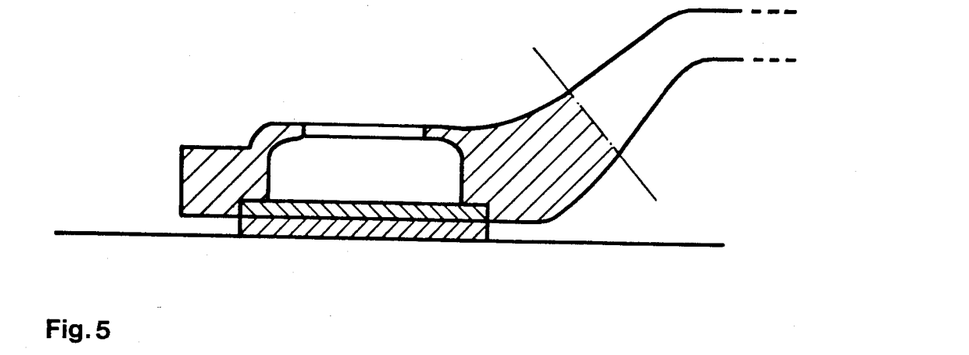
FIG. 5 is a cross-section of a non-brazed clamp.

Small metal objects such as clamps may be attached by brazing in the manner described above. FIG. 5 illustrates a cross-section of a non-brazed clamp.

Certain demands are raised concerning the material of the metal plate 4. Since it constitutes a portion of the brazed connection, together with the base which is preferably steel and the cable lug, preferably of copper, the surfaces thereof must be compatible with steel and copper with respect to brazing. It should also be corrosion resistant in order to avoid the appearance of oxide coatings during storing and transport before brazing. To avoid local through melting it should have a good thermal conductivity and a high melting point. A material that appears to meet these demands is pure nickel.

The metal plate 4 which in its simplest form is flat, equally thick and preferably circular, is provided with silver brazing metal 5 which is preferably brazed to the bottom face of the plate (FIG. 6a). The properties of the plate can be improved by special shaping thereof. It has been previously described that the electrode is pushed back towards the base after the current has been disconnected when brazing is finished. During the brazing procedure the plate adopts such a high temperature that the strength thereof is reduced considerably. If the plate is vaulted as in FIG. 6b, it will be deformed by the end of the brazing process and pressed down to the base by the remaining electrode. The molten brazing mtal underneath is then pressed out under the surrounding cable lug or clamp. This is advantageous since the capillarity under the cable lug (clamp) is sometimes reduced due to the uneven surface of the base. The described shape also provides a balancing of the heat generated by the electric arc whereby the heat is distributed more evenly down towards the base.

The same properties are obtained by the embodiment according to FIG. 6c. The metal plate can also be designed to compensate for temperature variations of the brazing spot which may occur if the metal masses inherent in the joint are unsymmetrically located with regard to the center of the brazing spot, such as a cable lug with a cable. FIGS. 6d–e illustrate cross-sections of such embodiments.

Figure 6F:
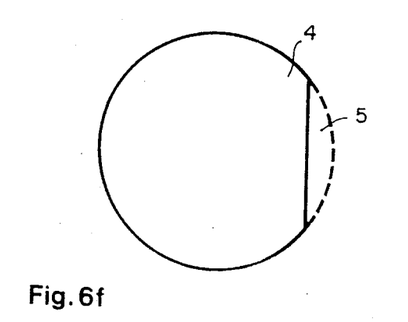
Figure 6G:
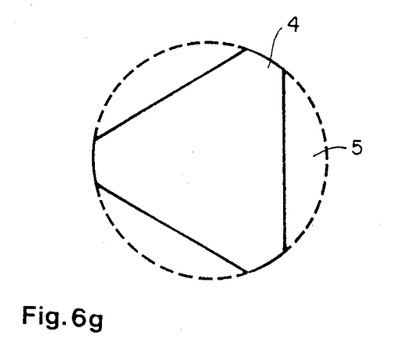
Figure 6H:
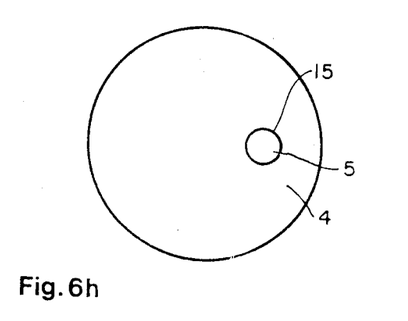
Figure 6I:
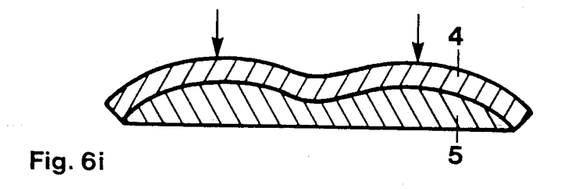
Figure 6K:
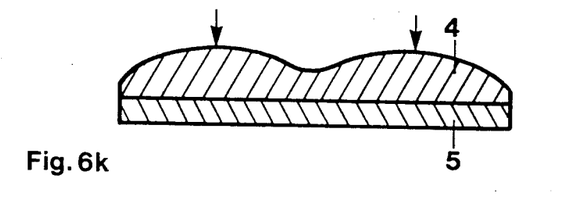
Figure 6M:
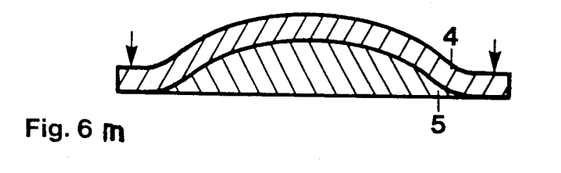
Figure 6N:
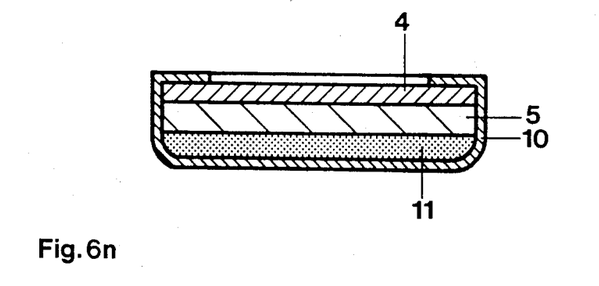
Figure 6P:
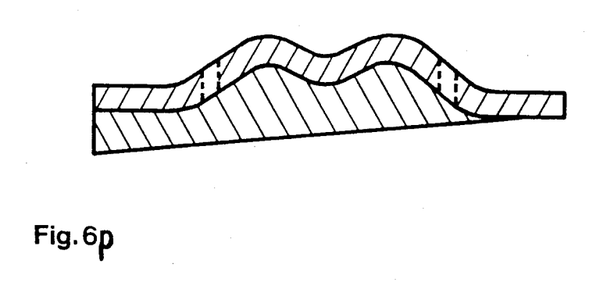

In FIGS. 6f–h further different embodiments of metal plate 4 constituting a part of the connecting piece of the present invention are shown in top plan view in the longitudinal direction of the electrode for the purpose described above with reference to FIGS. 6a–e. For example, FIG. 6h shows a metal plate 4 with hole 15 for supply of a fluxing agent. In order to prevent the point of action of the electric arc (the cathode spot) from remaining at the same position of the plate during the entire brazing process, which may cause localized melting thereof and evaporation of certain components of the brazing metal underneath, the plate can be provided with an annular ridge on its top side (FIGS. 6i, k) which causes the cathode spot to move annularly during the brazing causing a more even distribution of heat. The peripheral portions of the plate are preferably formed to facilitate the flow of brazing metal and to provide a capillarity which is as even as possible (FIG. 6m). The plate 4 with silver brazing metal 5 may also be provided with a capsule 10 of for example silver brazing metal containing a fluxing agent 11 (FIG. 6n). These variations of details may preferably be combined to provide the preferred distribution of heat and brazing metal, for example according to FIG. 6p.

Figures 7A, 7B:
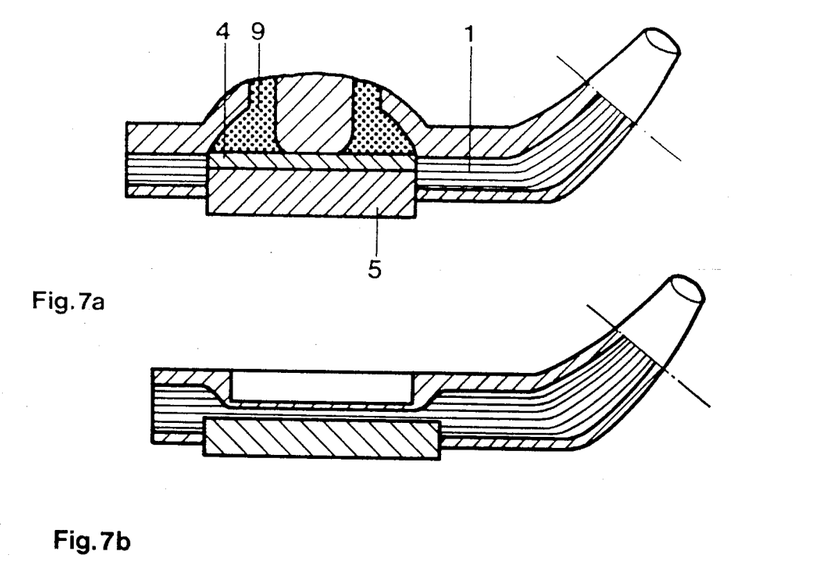
FIGS. 7a–d illustrate various embodiments of electric contact connections.

FIGS. 7a–d illustrate some alternative embodiments of the connection piece. As has been described above, the molten off electrode material 9 directly engages the individual cable wires 1, thereby ensuring good electric contact. The connection piece may also be formed so that the silver brazing metal 5 applied below the metal place 4 will directly engage the cable wires 1 (FIG. 7a).

Figure 7C:
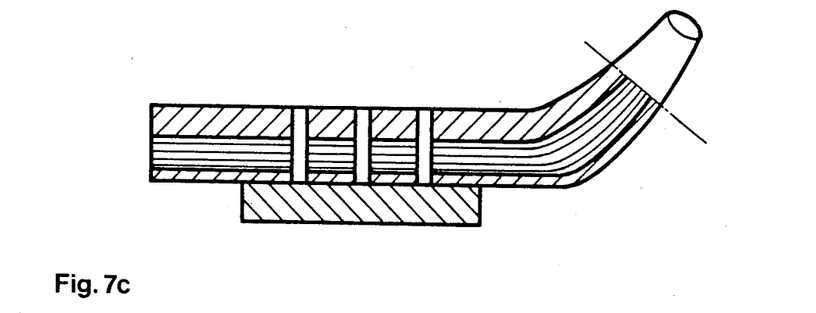

The present invention should not be restricted to embodiments of a connection in which a high-melting metal such as nickel constitutes the point of action of the electric arc. The advantages of the present invention can also be achieved by forming the cable lug so that a portion thereof constitutes the point of action of the electric arc. Examples of such embodiments are shown in FIGS. 7b and c.

Figure 7D:
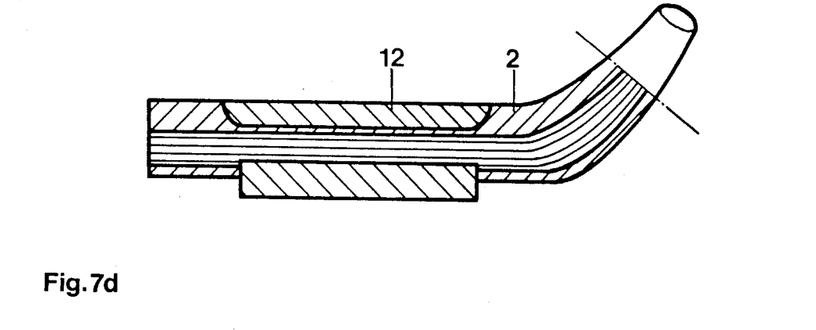

The cable lug 2 can also be provided with a certain amount of metal or metal alloy 12 which melts in the brazing moment and subsequently emits the adsorbed fusion heat during solidifying (FIG. 7d). By selecting a metal or metal alloy having a melting point below the austenitizing temperature of steel, for example 700° C., it is ensured that forming of martensite will not take place in a steel base.

Figure 8A:
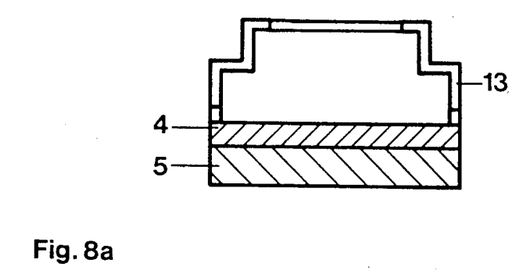
FIGS. 8a–b illustrate an embodiment of the invention adapted for attaching bar-shaped means, such as bolts, by brazing.
Figure 8B:
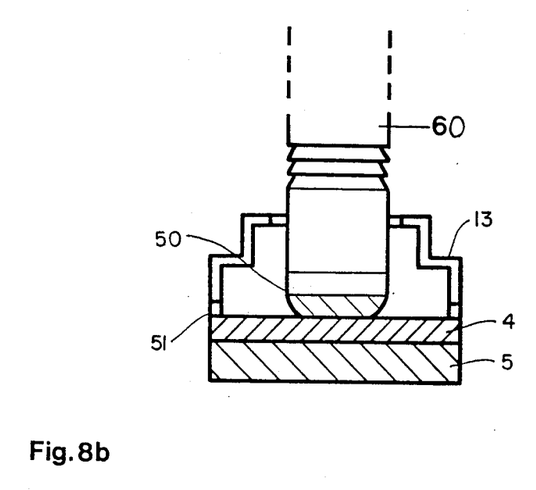

When bolts and pins are attached by brazing to a base and the electrode constitutes the bolt or pin the high-melting metal plate 4 with the low-melting brazing metal 5 is preferably applied to a protective ring 13 of ceramics which is normally used in pin brazing (FIG. 8a). FIG. 8b shows the position of the electrode 6 in this embodiment a bolt, immediately before the brazing process is started. A bar-shaped electrode 60 includes at its tip a capsule of a brazing metal 50 with fluxing agent 51. The metal plate provided with brazing metal can also be placed loosely on the base before brazing.

While particular embodiments of the invention have been shown, it should be understood that the invention is not limited thereto, since modifications may be made, and it is contemplated to cover by the appended claims any such modifications as fall within the spirit and scope of the invention.

We claim:

1. A method of connecting a connection piece of metal to a base metal surface by brazing, comprising the steps of:
   providing heat generated by an electric arc from a consumable electrode;
   conducting said heat through at least a portion of said connection piece,
   causing melting of a brazing metal provided between said connection piece and said base metal surface,
   applying a mechanical force to said portion of said connection piece after current to the electric arc has been disconnected,
   pressing said connection piece against said base metal surface, and
   wherein said portion of said connection piece prevents the electric arc from direct contact with said base metal surface and said brazing metal, thereby preventing disadvantageous thermal actuation of said base metal surface.

2. A method according to claim 1, wherein said connection piece comprises a cable lug and a metal plate, said metal plate being provided between said cable lug and said brazing metal, said metal plate preventing direct contact between the electric arc and the base metal surface.

3. A method according to claim 2, wherein the electric arc is established between the consumable electrode and said metal plate and the molten material from the electrode is brought into contact with said metal plate for interconnecting said metal plate and the cable lug to said base metal surface by brazing, said metal plate separates the molten material from said brazing metal, whereby alloying of the brazing metal by electrode material is avoided.

4. A method according to claim 2, wherein the metal plate and the brazing metal are partly enclosed by the cable lug and a cable is connected to said cable lug, the heat from the metal plate causes the brazing metal to melt so that molten material brazes the cable wires to each other and to the cable lug.

5. A method according to claim 1, wherein said connection piece comprises a bar-shaped means and a metal plate, said metal plate being provided between said bar-shaped means and said brazing metal, said metal plate preventing direct contact between the electric arc and said base metal surface.

6. A method according to claim 5, wherein said bar-shaped means comprises metallic material such as brass, an additional brazing metal and a fluxing agent being provided between said means and the metal plate.

7. A method according to claim 2 or 5, wherein said metal plate comprises a high-melting material in relation to said brazing metal.

8. A method according to claim 7 wherein said brazing metal comprises silver.

9. A method according to claim 7, wherein said metal plate is provided with at least one opening for the supply of a fluxing agent.

10. A method according to claim 6 wherein said bar-shaped means comprises a capsule of said additional brazing metal provided at a tip of said bar-shaped means, said capsule containing said fluxing agent.

* * * * *